G. S. PARKER.
GAME CARDS.
APPLICATION FILED APR. 7, 1909.
952,939.
Patented Mar. 22, 1910.
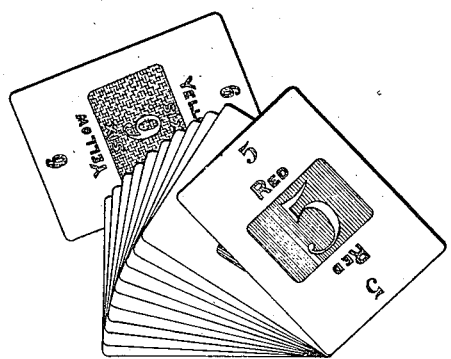
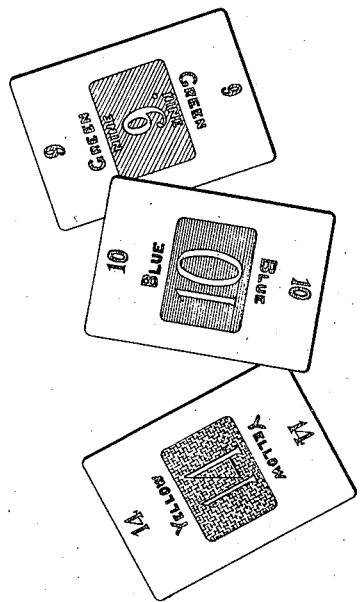
Witnesses:
Francis H. Bishop.
Horace A. Crossman.
Inventor:
George S. Parker
by Emery & Booth.
Att'ys.

UNITED STATES PATENT OFFICE.

GEORGE S. PARKER, OF SALEM, MASSACHUSETTS, ASSIGNOR TO PARKER BROTHERS, INCORPORATED, OF SALEM, MASSACHUSETTS, A CORPORATION OF MAINE.

GAME-CARDS.

952,939.  Specification of Letters Patent.   Patented Mar. 22, 1910.

Application filed April 7, 1909. Serial No. 488,457.

*To all whom it may concern:*

Be it known that I, GEORGE S. PARKER, a citizen of the United States, residing at Salem, in the county of Essex and State of Massachusetts, have invented an Improvement in Game-Cards, of which the following description, in connection with the accompanying drawings, is a specification, like letters on the drawings representing like parts.

My invention relates to games, being more particularly concerned with the provision of a pack of cards suitable for purposes of instruction and amusement and embodying the features both of colors and numerals.

My invention will be best understood by reference to the following description when taken in connection with the accompanying illustration of one specific embodiment thereof, while its scope will be more particularly pointed out in the appended claims.

In the drawings there are shown, for illustrative purposes certain cards with their displayed characteristics which, for the best use and adaptation of my invention, are preferably included in the card pack embodying my invention.

Referring to the drawings and to the embodiment of my invention there submitted for illustrative purposes, the card pack there disclosed comprises a plurality of certain cards displaying one distinctive color and certain others another distinctive color. Any desired number of colors may be employed, but herein I have shown several cards displaying one red, another blue, another green and another yellow. If desired, for purposes of color combinations, additional colors may be added. For example, in addition to those referred to there might be employed purple cards, orange cards, and others, although the four colors referred to will ordinarily be sufficient for amusement purposes.

Referring to the individual color cards these may, if desired, present each a solid background of its characteristic color, broken only by such symbols as the card displays, or the color may be displayed in some other striking way. Herein each card is provided with a central color panel covering a sufficient area of the card to be unmistakable and command attention. The colored portions of the separate cards of the same color are preferably, though not necessarily, the same as to shape and position, and the color designations for the cards of the different colors are preferably the same except for the distinctive shades used.

Herein, for the purpose of color comparison, as well as to permit the ready identification of the color card under all conditions as, for example, under artificial light, or in case of color blindness, on each color card there is prominently displayed the name of the color printed in its own color. For example, each card of the red color has the color designation "Red" displayed in red upon its face; the green cards "Green"; the blue cards "Blue"; the yellow cards "Yellow", and so on. Preferably also to assist this identification the colors and color names are chosen with a view to presenting a different initial letter, the initial letters herein being R, G, B and Y. If desired, prominence may be given the initial letter of the color by making it larger or printing in some different style from the other letters of the color name.

The different cards of the same color are distinguished by the display of different identifying symbols which preferably, as herein, consist of different numerals representing different values. Such numerals, which may or may not follow in sequence or order, may be displayed in any suitable way, being herein prominently imprinted or presented upon the color panel at the center of the card, and also above and below such panel.

The cards bearing the numerals 6 and 9, if such numerals are used, have preferably displayed upon their faces, as upon the panel, also the words "six" and "nine" respectively; and, if desired, other characteristic markings may be added, such as a period located after each numeral, so that it cannot be mistaken by reading the card upside down.

While the numerals shown by the cards of the same color are preferably, though not necessarily, different, the same numeral is preferably (though also not necessarily) repeated in each of the several colors employed, so that there are as many cards with the value six as there are colors employed.

Any desired number of cards may be provided of each color, the particular numeral displayed by each one being immaterial. However, for the purpose of emphasizing certain color cards above others, I preferably provide in each color the numeral cards 5, 10 and 14 to serve as "count cards" to which an especial value is attached. Such count cards may be specially designated as such or may be arbitrarily agreed upon to serve as such.

In the drawings I have indicated for illustrative purposes one each of the count cards, "5," "10" and "14" and also a "6" card and a "9" card. It will of course be understood that these are preferably repeated for each color. In addition I have also indicated additional cards which will bear other numerals (preferably repeated in each color), such additional cards being supplementary in their use to the count cards and "6" and "9" cards.

With the various groups of color cards referred to and distinguishable from each other, as described, a variety of entertaining games may be played. These may be for purposes of amusement only, or profitable instruction in color discrimination may be given.

To illustrate the use of the cards above described the following is one of the games which I have devised for which these cards are used. The dealer in this game deals four cards to each player, and four to the center of the table which he places face up. The player at the left of the dealer, provided he holds in his hand any card the central number on which is equal to the sum of two or more of the cards in the center of the table, may capture those cards, provided one of the cards so captured be the same color as the card which matches their sum. Thus, if the player holds a green 11, there being a yellow 4 and green 7 exposed in the center pile, he may match and remove the "4" and "7" laying them aside with card which equaled their sum. If, however, neither the "7" nor the "4" were green, he could not make this play. The card "14," usually called in this and in other games devised by me "high 14," can only be captured by a player holding the combination of a "9" and "6" in his hand, one of which numbers must be of the same color as the "14" in the center of the table. The turn to match passes to the left, the object of each player being to obtain the count cards which consist of the 14's, 10's and 5's captured and laid aside and of the 9's and 6's of the same color captured or saved, which will give a premium count of say 15 when so combined. Should a player capture or save a "9" and "6" of two colors, which, when mixed together, would form in a physical sense a third color, they obtain a premium count therefor. Thus, if a player has saved or captured cards containing a "9 yellow" and a "6 red" he is said to have made an orange, which gives him a premium count, or if he saves a "9 blue" and a "6 yellow" the combination scores a green, giving him a premium count of say 25 points, the idea being that the combining of two colors so as to make a third is productive of advantage to the player. When any player's hand is exhausted, a sufficient number of cards are dealt to all players around the table, so that each will hold four, the turn to match passing and the play thus continuing.

The object of this game, which is only one of a number for which these cards are devised, is the winning of a certain number of points by making count of the "5," "10" and "14" cards and the combination of two colors in 9's and 6's which would result in a third distinctive color as above described.

While I have herein described, for purposes of illustration, one specific card pack and one particular game, it is to be understood that this is illustrative only and that the invention is not limited to the details of the form and arrangement of cards or to the use made thereof, but that departures therefrom may be made without deviating from the spirit of my invention.

Having thus described my invention, what I claim is:

1. A pack of cards comprising three or more groups, the cards of each group displaying distinctively a color peculiar to that group, and each color card displaying an identifying number, the numbers being different for the cards of the same color, but repeated in the cards of each other color, the numeral designations of the cards including the designations "6" and "9" and the cards bearing the latter designations having applied thereto also additional designations to determine the position in which the card must be held for correctly reading the same, the colors of the different cards being so selected that the combination of two of the colors is suggestive of the creation of a third color.

2. A pack of cards comprising three or more groups the cards of each group displaying distinctively a color peculiar to that group, and each color card displaying an identifying number, the numbers being different for the cards of the same color, but repeated in the cards of each other color, the colors of the different cards being so selected that the combination of two of the colors is suggestive of the creation of a third color.

3. A pack of cards comprising three or more groups the cards of each group displaying distinctively a color peculiar to that group and each card displaying an identifying number, each bearing also the printed name of its distinctive color, the different colors used being so selected that there shall be an entire differentiation in the initial letters of the printed color names, and being also so selected that the combination of two of the colors is suggestive of the creation of a third color.

In testimony whereof, I have signed my name to this specification, in the presence of two subscribing witnesses.

GEORGE S. PARKER.

Witnesses:
LELAND H. COLE,
BENJ. F. NASON.